(12) United States Patent
Wen et al.

(10) Patent No.: US 10,466,511 B2
(45) Date of Patent: Nov. 5, 2019

(54) COMPOSITIONS CONTAINING THERMALLY-INDUCED SELF-ASSEMBLY OF NONIONIC SURFACTANTS AND THEIR APPLICATION IN SMART GLASS TECHNOLOGIES

(75) Inventors: Weijia Wen, Hong Kong (CN); Ping Sheng, Hong Kong (CN); Jiaxing Li, Hong Kong (CN); Xiuqing Gong, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 399 days.

(21) Appl. No.: 13/513,077

(22) PCT Filed: Nov. 30, 2010

(86) PCT No.: PCT/CN2010/001921
§ 371 (c)(1),
(2), (4) Date: May 31, 2012

(87) PCT Pub. No.: WO2011/066718
PCT Pub. Date: Jun. 9, 2011

(65) Prior Publication Data
US 2012/0234465 A1    Sep. 20, 2012

(51) Int. Cl.
*G02B 1/04* (2006.01)
*B32B 27/00* (2006.01)
(Continued)

(52) U.S. Cl.
CPC ............ *G02F 1/0147* (2013.01); *C08L 71/02* (2013.01); *C08G 2650/58* (2013.01);
(Continued)

(58) Field of Classification Search
None
See application file for complete search history.

(56) References Cited

U.S. PATENT DOCUMENTS 4,169,661 A * 10/1979 Yamada et al. ............... 359/289
5,147,923 A *  9/1992 Mueller ................ C08F 220/18
524/555

(Continued)

FOREIGN PATENT DOCUMENTS

CN    1058795 A    2/1992
JP    53-143676 A  12/1978
(Continued)

OTHER PUBLICATIONS

Derwent abstract, Derwent-Acc-No: 08583B (.*
(Continued)

*Primary Examiner* — Kenneth J Stachel
(74) *Attorney, Agent, or Firm* — Nath, Goldberg & Meyer; Joshua B. Goldberg

(57) ABSTRACT

The present subject matter relates generally to the use of thermally induced self-assembly of surfactants, such as poly(ethylene oxide)-poly(propylene oxide)-poly(ethylene oxide) or 4-octylphenol polyethoxylate, to vary the transparency or opacity of a composition containing the same. The compositions of the present subject matter can be used in smart window technologies.

1 Claim, 10 Drawing Sheets
(10 of 10 Drawing Sheet(s) Filed in Color)

(51) Int. Cl.
    G02F 1/01      (2006.01)
    C08L 71/02     (2006.01)
(52) U.S. Cl.
    CPC .......... Y10T 428/31645 (2015.04); Y10T
            428/31649 (2015.04); Y10T 428/31692
        (2015.04); Y10T 428/31699 (2015.04); Y10T
                428/31855 (2015.04); Y10T 428/31935
                                            (2015.04)

(56)            References Cited

U.S. PATENT DOCUMENTS

| | | | | |
|---|---|---|---|---|
| 5,223,313 | A * | 6/1993 | Holzer | B32B 17/10311 |
| | | | | 428/192 |
| 6,020,989 | A * | 2/2000 | Watanabe | B32B 17/10311 |
| | | | | 359/288 |
| 6,342,206 | B1 * | 1/2002 | Gopalkrishnan | A61K 8/042 |
| | | | | 424/49 |
| 6,599,683 | B1 * | 7/2003 | Torek et al. | 430/326 |
| 6,632,619 | B1 * | 10/2003 | Harrison | B01J 19/0093 |
| | | | | 422/504 |
| 2006/0057312 | A1 * | 3/2006 | Watanabe | B32B 17/06 |
| | | | | 428/34 |
| 2006/0264571 | A1 * | 11/2006 | Siol | C08F 222/1006 |
| | | | | 516/98 |
| 2008/0069962 | A1 * | 3/2008 | Light, II | G01N 27/3271 |
| | | | | 427/384 |
| 2010/0233266 | A1 * | 9/2010 | Cleek | A61K 9/0024 |
| | | | | 424/488 |

FOREIGN PATENT DOCUMENTS

| | | | | |
|---|---|---|---|---|
| WO | WO 8607601 | A1 * | 12/1986 | ....... B32B 17/10486 |
| WO | WO 0063009 | A1 * | 10/2000 | ....... B32B 17/10486 |

OTHER PUBLICATIONS

ACS Scifinder abstract Accession No. 1979:440580, CAN 91:40580 (1979).*
Vieira article Micelle and Surface in Mixes of EPE Copolymers ACS (2005).*
Ni Article Supramolecular EPE Triblockhydrogels (2008).*
English machine translation of WO 8607601 (1986).*
Interaction of ABA Block Copolymers with Ionic Surfactants Influence on Micellization and Gelation, Hecht et al. J Phys Chem 99, 4866-4874 (1995).*
Lee, et al., "Thermo-sensitive, injectable, and tissue adhesive sol-gel transition hyaluronic acid/pluronic composite hydrogels prepared from bio-inspired catechol-thiol reaction," Soft Matter, (2010), vol. 6, pp. 977-983.
Deshmukh, et al., "Molecular modeling of thermo-responsive hydrogels: observation of lower critical solution temperature," Soft Matter, (2009), vol. 5, pp. 1514-1521.
Ling, et al., "Thermo and pH dual responsive Poly (N-isopropylacrylamide-co-itaconic acid) hydrogels prepared in aqueous NaCl solutions and their characterization," J Polym Res (2009), vol. 16, pp. 29-37.
Masci, et al., "Dielectric Properties of Thermo-Reversible Hydrogels: The Case of a Dextran Copolymer Grafted with Poly(N-isopropylacrylamide)," J. Phys. Chem. B, (2009), vol. 113, pp. 11421-11428.

Zhang, et al., "Dual thermo- and pH-sensitive poly(N-isopropylacrylamide-co-acrylic acid) hydrogels with rapid response behaviors," Polymer, (2007), vol. 48, pp. 1718-1728.
Yan, et al., "Thermo-and pH-sensitive poly(vinylmethyl ether)/carboxymethylchitosan hydrogels crosslinked using electron beam irradiation or using glutaraldehyde as a crosslinker," Society of Chemical Industry, (2009), vol. 58, pp. 1246-1251.
Moon, et al., "Biodegradable Thermo- and pH-Responsive Hydrogels Based on Amphiphilic Polyaspartamide Derivatives Containing N,N-Diisopropylamine Pendants," Macromolecular Research, (2008), vol. 16, No. 6, pp. 489-491.
Chen, et al., "Preparation and evaluation of thermo-reversible copolymer hydrogels containing chitosan and hyaluronic acid as injectable cell carriers," Polymer, (2009), vol. 50, pp. 107-116.
Chacon, et al., "Swelling and protein absorption/desorption of thermo-sensitive lactitol-based polyether polyol hydrogels," Polymer, (2000), vol. 41, pp. 8257-8262.
Ueno, et al., "An Electro- and Thermochromic Hydrogel as a Full-Color Indicator," Adv. Mater., (2007), vol. 19, pp. 2807-2812.
Tasdelen, et al., "Investigation of drug release from thermo- and pH-sensitive poly(N-isopropylacrylamide/itaconic acid) copolymeric hydrogels," Polym. Adv. Technol., (2004), vol. 15, pp. 528-532.
Morimoto, et al., "Thermo-Responsive Hydrogels with Nanodomains: Rapid Shrinking of a Nanogel-Crosslinking Hydrogel of Poly(N-isopropyl acrylamide)," Macromol. Rapid Commun., (2008), vol. 29, pp. 672-676.
Yang, et al., "Fabrication and properties of cucurbit[6]uril induced thermo-responsive supramolecular hydrogels," Soft Matter, (2009), vol. 5, pp. 3511-3516.
Seeboth, et al., "The first example of thermochromism of dyes embedded in transparent polymer gel networks," J. Mater. Chem., (1999), vol. 9, pp. 2277-2278.
Chung, et al., "Surfactant-Free Thermochromic Hydrogel System: PVA/Borax Gel Networks Containing pH-Sensitive Dyes," Journal of Applied Polymer Science, (2004), vol. 91, pp. 890-893.
Gong, et al., "Copolymer solution-based smart window," Applied Physics Letters, (2009), vol. 95, pp. 251907-1-251907-3.
Schott, "Effect of Inorganic Additives on Solutions of Nonionic Surfactants," Journal of Colloid and Interface Science, (1997), vol. 189, pp. 117-122.
Schott, "Comparing the Surface Chemical Properties and the Effect of Salts on the Cloud Point of a Conventional Nonionic Surfactant, Octoxynol 9 (Triton X-100), and of Its Oligomer, Tyloxapol (Triton WR-1339)," Journal of Colloid and Interface Science, (1998), vol. 205, pp. 496-502.
Palgrave, et al., "Aerosol assisted chemical vapour deposition of photochromic tungsten oxide and doped tungsten oxide thin films," J. Mater. Chem., (2004), vol. 14, pp. 2864-2867.
Guo, et al., "Hydration and Conformation of Temperature-Dependent Micellization of PEO-PPO-PEO Block Copolymers in Aqueous Solutions by FT-Raman," Langmuir, (1999), vol. 15, pp. 2703-2708.
Levy, "Photochromic Sol-Gel Materials," Chem. Mater., (1997), vol. 9, pp. 2666-2670.
Schott, "Effect of Inorganic Additives on Solutions of Nonionic Surfactants," Journal of Colloid and Interface Science, (1995), vol. 173, pp. 265-277.
Schott, "Effect of inorganic additives on solutions of nonionic surfactants—XVI. Limiting cloud points of highly polyoxyethylated surfactants," Colloids and Surfaces, (2001), vol. 186, pp. 129-136.
Li, et al., "Facile Fabrication, properties and application of novel thermo-responsive hydrogel," Smart Mater. Struct., (2011), vol. 20, pp. 1-7.

* cited by examiner

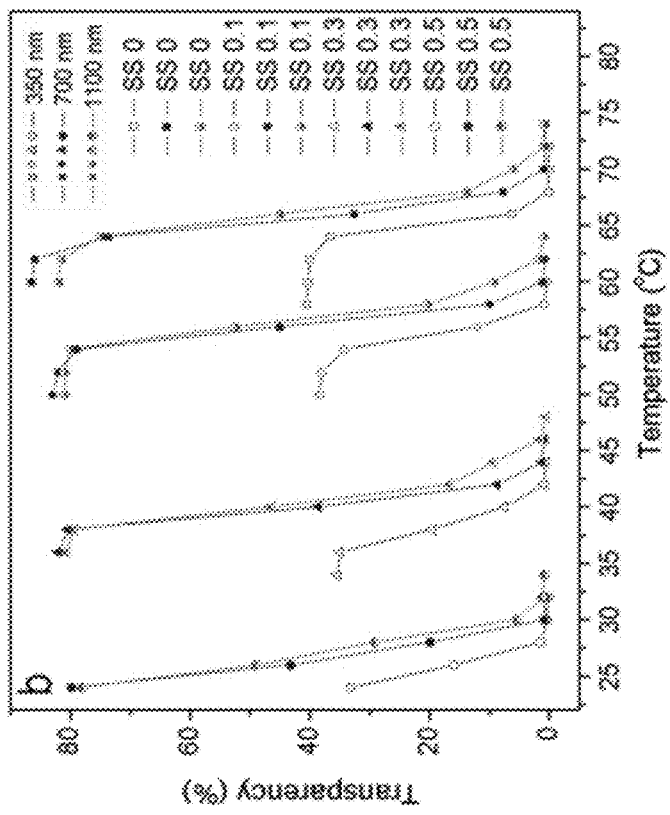
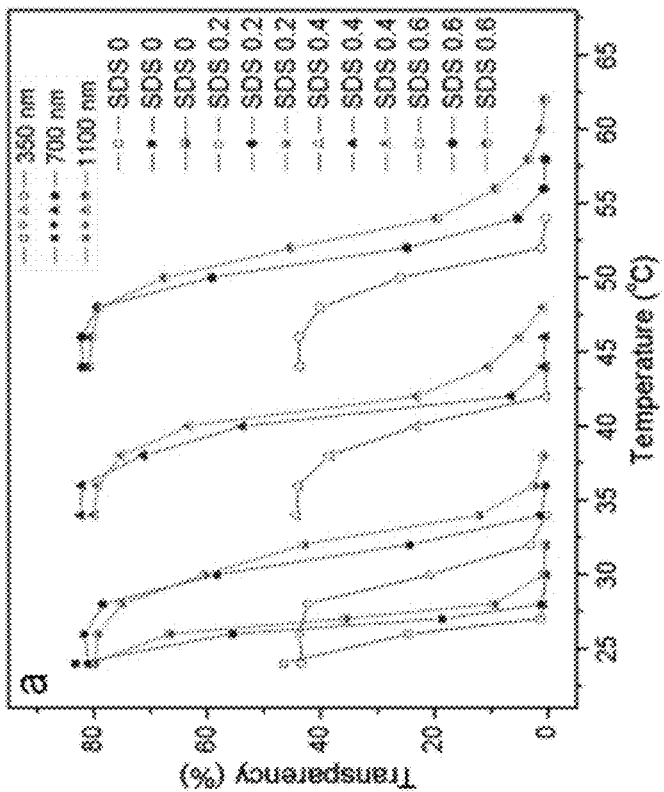
FIG. 7a
FIG. 7b

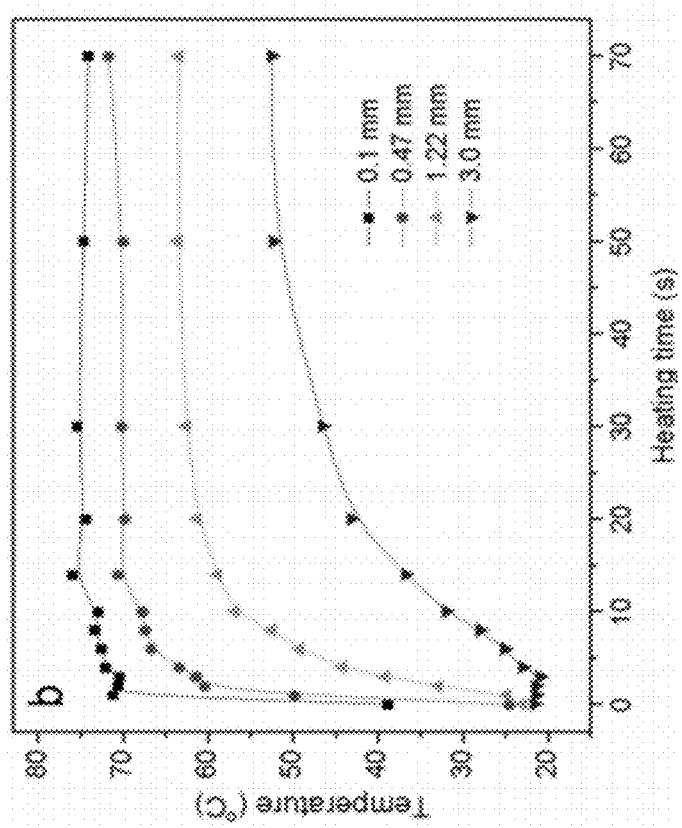
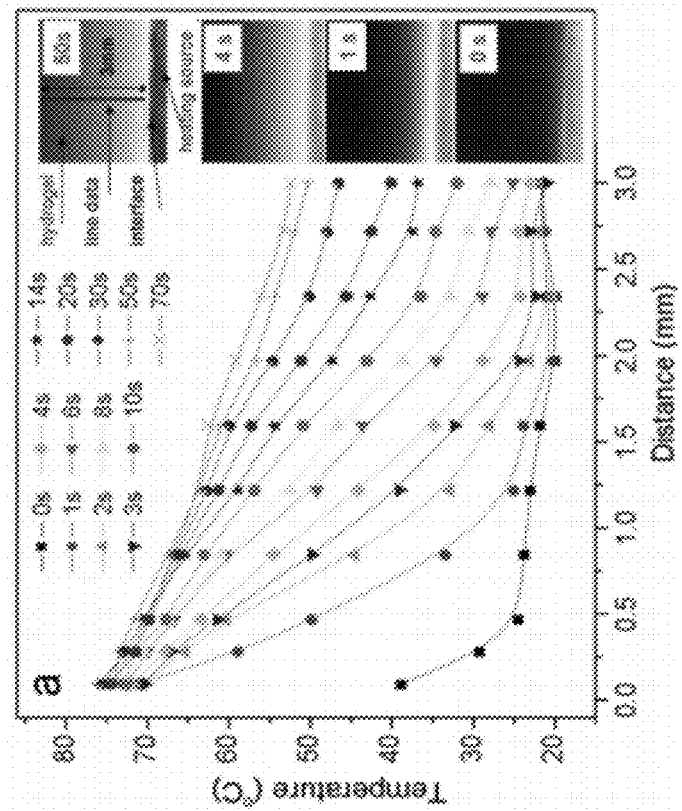
FIG. 9a
FIG. 9b

COMPOSITIONS CONTAINING THERMALLY-INDUCED SELF-ASSEMBLY OF NONIONIC SURFACTANTS AND THEIR APPLICATION IN SMART GLASS TECHNOLOGIES

This is a National Phase Application filed under 35 U.S.C. 371 as a national stage of PCT/CN2010/001921, filed Nov. 30, 2010, an application claiming the benefit from the U.S. Provisional Application No. 61/272,992, filed Dec. 1, 2009, and U.S. Provisional Application No. 61/344,515, filed on Aug. 12, 2010, the content of each of which is hereby incorporated by reference in its entirety.

FIELD OF THE INVENTION

The present subject matter relates generally to the use of thermally induced self-assembly surfactants to vary the transparency or opacity of a composition containing the same. Representative surfactants in this regard include those containing a polyethoxy group, such as the tri-block polymer poly(ethylene oxide)-poly(propylene oxide)-poly(ethylene oxide) (PEO-PPO-PEO or EPE):

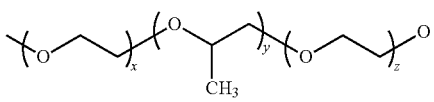

or 4-octylphenol polyethoxylate (TX-100):

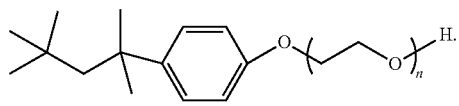

BACKGROUND OF THE INVENTION

The smart window is a system that can sense and respond to external stimuli such as light, heat, or electricity. It controls light passage, promising the advantages of reversible control of indoor light and temperature in applications to next-generation household or industrial windows. Various systems have been tested over the years.

Intelligent liquids and hydrogels have resulted in the development of new materials that have found applications in many areas of optics and materials science. (See Y. D. Ling, M. G. Lu, *Journal of Polymer Research* 2009, 16, 29; G. Masci, C. Cametti, *Journal of Physical Chemistry B* 2009, 113, 11421; J. Zhang, L. Y. Chu, Y. K. Li, Y. M. Lee, *Polymer* 2007, 48, 1718; S. F. Yan, J. B. Yin, Y. Yu, K. Luo, X. S. Chen, *Polymer International* 2009, 58, 1246; J. R. Moon, J. H. Kim, *Macromolecular Research* 2008, 16, 489; J. P. Chen, T. H. Cheng, *Polymer* 2009, 50, 107; D. Chacon, Y. L. Hsieh, M. J. Kurth, J. M. Krochta, *Polymer* 2000, 41, 8257; B. Tasdelen, N. Kayaman-Apohan, O. Guven, B. M. Baysal, *Polymers for Advanced Technologies* 2004, 15, 528; D. Schmaljohann, D. Beyerlein, M. Nitschke, S. Zschoche, C. Werner, *Abstracts of Papers of the American Chemical Society* 2003, 225, U709; N. Morimoto, T. Ohki, K. Kurita, K. Akiyoshi, *Macromolecular Rapid Communications* 2008, 29, 672; Y. Y. Lang, S. M. Li, W. S. Pan, L. Y. Zheng, *Journal of Drug Delivery Science and Technology* 2006, 16, 65; H. Yang, Y. B. Tan, Y. X. Wang, *Soft Matter* 2009, 5, 3511.) These materials can be generally classified into three categories: electro-chromic, thermo-chromic and photo-chromic materials. For example, an electro-chromic window is usually composed of liquid crystal sandwiched between two panes of glass or plastic that are coated with indium tin oxide (ITO), a transparent conductive material. When an electrical voltage is applied to the ITO, the liquid crystal molecules change their orientations, so as to either allow or prevent the passing of light through the window.

Likewise, the thermo-chromic smart window typically uses a vanadium dioxide ($VO_2$)-type material, which can undergo a structural transition from a semiconductor to a metal at a critical temperature Tc. This transition is accompanied by an abrupt change in the optical properties, from transparent to opaque.

These thermo-chromic materials are currently being considered for application in thermally adjustable smart windows, smart roofs, large-area displays for information and traffic engineering, and temperature-sensing applications in medical technologies. (See A. Seeboth, J. Kriwanek, R. Vetter, *Journal of Materials Chemistry* 1999, 9, 2277; W. Y. Chung, S. M. Lee, S. M. Koo, D. H. Suh, *Journal of Applied Polymer Science* 2004, 91, 890; K. C. Labropoulos, D. E. Niesz, S. C. Danforth, P. G. Kevrekidis, *Carbohydr. Polym.* 2002, 50, 393.)

The application of the so-called intelligent liquids and hydrogels is based on the opaque-transparent reversible property with temperature or electric fields, which can control the passage of light. In the last decade, reversible thermo-chromic liquids and hydrogels that are sensitive to external temperature have been extensively investigated, although thermo-chromic hydrogels besides poly(N-isopropylacrylamide) (PNIPAAm) hydrogel have rarely been described. PNIPAAm hydrogel is the best known temperature sensitive polymeric network, from which many kinds of hydrogels were derived. (See Y. D. Ling, et al.; G. Masci, et al.; J. Zhang, et al.; S. F. Yan, et al.; J. R. Moon, et al.; J. P. Chen, et al.; D. Chacon, et al.) All of these hydrogels present the properties of volume phase transitions when either temperature or pH changes. (See B. Tasdelen, et al.; D. Schmaljohann, et al.; N. Morimoto, et al.; Y. Y. Lang, et al.) Recently, Ling et al. reported one kind of PNIPAAm hydrogel prepared in brine, which undergoes transparent-opaque transitions with an increase in NaCl concentration. However, this kind of hydrogel with a high NaCl concentration breaks into pieces due to its poor strength and/or its specific volume phase transition. Yang et al. investigated one thermo-responsive supermolecular hydrogel consisting of cucurbit[6]uril and butan-1-aminium 4-methylbenzenesulfonate, which presents a gel(opaque)-sol(transparent) transition with a change in the temperature. Seeboth et al. and Chung et al. developed types of hydrogels with a dye embedded in a polyvinyl alcohol/borax/surfactant gel network, which respond to changes in temperature with reversible color changes.

In general, many of the currently known thermally-induced hydrogels have many advantages, such as being free of an organic solvent, being nonflammable, being degradable and having a high transparency, but the high cost of materials limits their practical applications, especially in the field of large-area smart windows and roofs. In contrast, the presently described stable, easily adjustable, innocuous, biodegradable liquid and hydrogel compositions can be made by using cheap and easily available industrial materials, such as thermally induced self assembly surfactants and hydrogel bases, such as agarose.

SUMMARY OF THE INVENTION

The present subject matter relates to a liquid or hydrogel composition comprising a thermally induced nonionic surfactant that is reversibly temperature responsive. Preferably, the composition can obtain a cloudy appearance induced by increasing the temperature. The temperature at which the cloudiness appears is termed the cloud point or the opaque-transparent transition temperature (OTTT). Such a phenomenon may be reversible if the temperature is lowered.

In an embodiment, the present subject matter relates to a liquid or hydrogel composition comprising, a thermally induced self-assembly surfactant; an additive; a liquid carrier; and optionally, a hydrogel base material, wherein the composition becomes opaque at or above an opaque-transparent transition temperature (OTTT).

In a further embodiment, the present subject matter relates to a liquid or hydrogel composition wherein the thermally induced self-assembly surfactant is a nonionic surfactant containing a polyethoxy group.

In a yet further embodiment, the present subject matter relates to a liquid or hydrogel composition wherein the nonionic surfactant is selected from the group consisting of poly(ethylene oxide)-poly(propylene oxide)-poly(ethylene oxide), 4-octylphenol polyethoxylate, and mixtures thereof.

In a still further embodiment, the present subject matter relates to a liquid or hydrogel composition wherein the additive is selected from the group consisting of sodium chloride (NaCl), sodium dodecyl sulfate, sodium sulfate ($Na_2SO_4$), magnesium sulfate ($MgSO_4$), magnesium chloride ($MgCl_2$), calcium sulfate ($CaSO_4$), calcium chloride ($CaCl_2$), ferric chloride ($FeCl_3$), sodium polyacrylate, polyvinylpyrrolidone, polyvinyl alcohol and mixtures thereof.

In a further embodiment, the present subject matter relates to a liquid or hydrogel composition wherein when the surfactant is EPE the additive is sodium chloride, sodium dodecyl sulfate or a mixture thereof.

In another embodiment, the present subject matter relates to a liquid or hydrogel composition wherein when the surfactant is TX-100 the additive is sodium sulfate.

In a further embodiment, the present subject matter relates to a liquid or hydrogel composition wherein the liquid carrier is water.

In a still further embodiment, the present subject matter relates to a liquid or hydrogel composition wherein the composition is in the form of a liquid.

In a yet further embodiment, the present subject matter relates to a liquid or hydrogel composition wherein the composition is in the form of a hydrogel.

In a further embodiment, the present subject matter relates to a liquid or hydrogel composition wherein the composition comprises a hydrogel base material.

In a still further embodiment, the present subject matter relates to a liquid or hydrogel composition wherein the hydrogel base material is selected from the group consisting of a polysaccharide, polypeptide, derivatives of acrylic acid and mixtures thereof. Derivatives of acrylic acid include polyacrylic acid and its derivatives, polymethacrylic acid and its derivatives, polyacrylamide and its derivatives, and polymers containing monomers of acrylic acid and/or methacrylic acid.

In another embodiment, the present subject matter relates to a liquid or hydrogel composition wherein the hydrogel base material is agarose.

In a further embodiment, the present subject matter relates to an apparatus comprising, at least two transparent panes positioned to form a void between the panes; and the liquid or hydrogel composition is positioned within the void between the at least two panes; wherein the composition becomes opaque at or above an opaque-transparent transition temperature (OTTT).

In a still further embodiment, the present subject matter relates to an apparatus wherein the transparent panes are selected from the group consisting of glass, polymeric film, and indium tin oxide (ITO) glass panes.

In a yet further embodiment, the present subject matter relates to an apparatus wherein the panes have a copper wire embedded therein.

In another embodiment, the present subject matter relates to an apparatus wherein an electric field is applied to heat the copper wire and in turn heat the liquid or hydrogel composition contained within the void.

In a further embodiment, the present subject matter relates to a method of controlling transparency a window, wall or roof comprising preparing an apparatus containing a liquid or hydrogel composition and adjusting the temperature at which the liquid or hydrogel composition turns opaque by controlling the amount of additive contained within the composition.

BRIEF DESCRIPTION OF DRAWINGS

The file of this patent contains at least one drawing executed in color. Copies of this patent with color drawing (s) will be provided by the Patent and Trademark Office upon request and payment of the necessary fee.

Various embodiments will now be described in detail with reference to the accompanying drawings.

FIG. 7 is a graph showing the (a) influence of SDS concentrations on transmittance of EPE hydrogel; and (b) influence of Na$_2$SO$_4$ (SS) concentrations on transmittance of TX-100 hydrogel, measured at different wavelengths 350 nm, 700 nm, and 1100 nm.

FIG. 9 is a graph showing the (a) thermal conductivity of hydrogel, temperature at different heating time as a function of distances; (b) temperature at different position as function of heating time.

DETAILED DESCRIPTION

Figure 1:
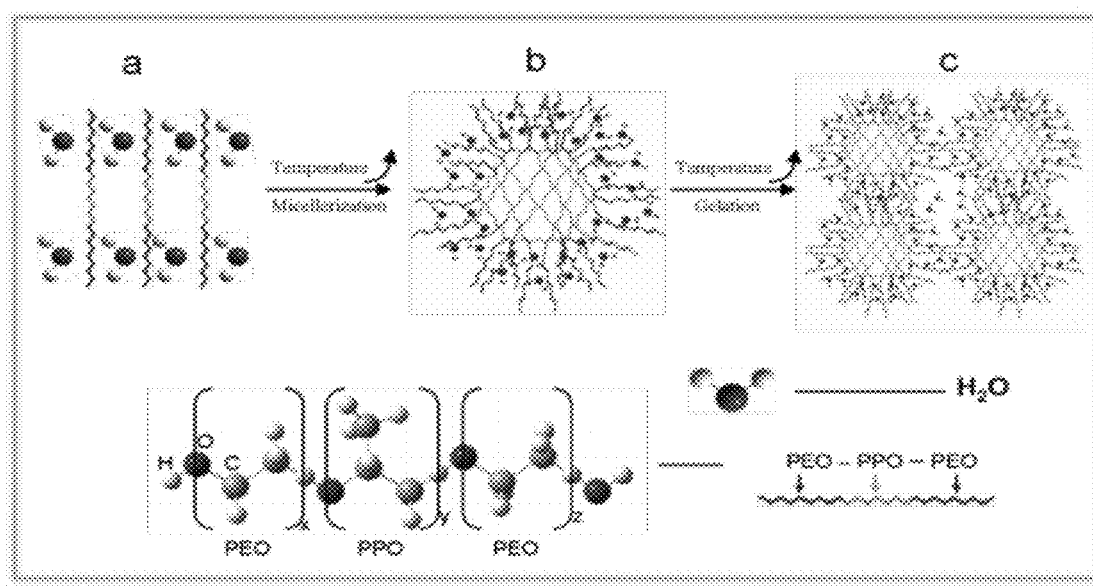
FIG. 1 (a) shows EPE molecules dispersed in water when there is no heating applied; (b) shows increasing the temperature leads to the formation of micelles; and (c) shows further increasing the temperature leads to the packing of micelles to form clusters.

The following definitions are provided for the purpose of understanding the present subject matter and for constructing the appended patent claims.

It is noted that, as used in this specification and the appended claims, the singular forms "a," "an" and "the" include plural references unless the context clearly dictates otherwise.

"Opaque-transparent transition temperature" means the temperature at which a transparent composition becomes cloudy or opaque.

"Cloud point" means the temperature at which dissolved solids are no longer completely soluble, precipitating as a second phase giving the fluid a cloudy appearance.

"Consolute temperature" means the temperature at which thermal motion overcomes the tendency for phase separation at all compositions.

"Agarose" is a linear polymer, made up of the repeating monomeric unit of agarobiose:

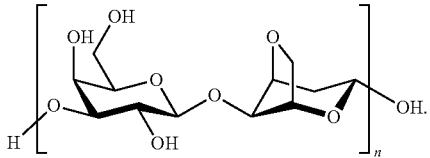

"Agarobiose" is a disaccharide made up of D-galactose and 3,6-anhydro-L-galactopyranose.

Unless defined otherwise all technical and scientific terms used herein have the same meaning as commonly understood to one of ordinary skill in the art to which the presently described subject matter pertains.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Some uncharged polymers have a lower consolute temperature in aqueous environments. Thus, the polymers phase separate at an increased temperature or at a temperature above the consolute temperature. A similar temperature effect is also observed for some nonionic surfactants. The temperature at which this phase separation occurs is known as the cloud point or the OTTT since this process involves a drastic increase in turbidity of the solution, which, in turn, influences the light transmittance. The OTTT of nonionic surfactants is very sensitive to the interactions in the system and can also be affected by the addition of other chemicals or additives. The effect of the additives, such as salt and/or ionic surfactants, on the OTTT of some nonionic surfactants in aqueous environments has been studied.

The surfactants of the present subject matter may be nonionic surfactants and may include tri-block copolymers containing a polyethoxy group. TX-100 and EPE are two types of readily available tri-block copolymers that are widely used as nonionic surfactants containing a polyethoxy group, due to their amphiphilic behavior in aqueous solution. Both TX-100 and EPE molecules have a hydrophobic group (4-octylphenol and polypropylene oxide (PPO), respectively) and a hydrophilic group (polyethoxy group and polyethylene oxide (PEO), respectively). There are a variety of specific EPEs that can be used herein, which are differentiated by their overall molecular weight and relative hydrophobic PPO and hydrophilic PEO block lengths. In one embodiment, the EPE surfactants of the present subject matter have a total molecular weight of about 1600 to about 2500, and a molecular weight of the PEO content of about 1500 to about 2000. In a preferred embodiment, the EPE surfactants of the present subject matter have a total molecular weight of about 2000, and a molecular weight of the PEO content of about 1600.

The compositions of the present subject can be formulated as liquids or hydrogels. Further, the liquid or hydrogel formulations can be prepared as oil-in-water emulsions. The surfactants of the present subject matter can be present in the liquid and hydrogel compositions from about 0.1 to about 5.0 w/v %. The additives of the present subject matter can be present in the liquid and hydrogel compositions from zero to about 1% w/v or from zero to 1M, depending on the additive selected. The hydrogel base material of the present subject matter can be present in the hydrogel compositions from about 0.1 to about 2 w.v %

The nonionic surfactants of the present subject matter, EPE and TX-100, experience phase separation at the OTTT and can self assemble to form micelles in aqueous (or liquid) environments due to the dehydration of the hydrophobic groups at a certain temperature. Such a phenomenon is reversible if the temperature variation is reversed. Various additives may be used to tune the OTTT of the surfactants so that the OTTT of the compositions containing the surfactants can be controllable. The additives useful for the compositions of the present subject matter are selected from the group consisting of sodium chloride (NaCl), sodium dodecyl sulfate, sodium sulfate (Na$_2$SO$_4$), magnesium sulfate (MgSO$_4$), magnesium chloride (MgCl$_2$), calcium sulfate (CaSO$_4$), calcium chloride (CaCl$_2$), ferric chloride (FeCl$_3$), sodium polyacrylate, polyvinylpyrrolidone, polyvinyl alcohol and mixtures thereof.

Different liquids and hydrogel compositions containing the nonionic surfactants of the present subject matter with different OTTTs can be created by varying the ratios of the surfactant to the additive. Adjusting the ratio of surfactant to the additive will raise or lower the OTTT of the liquid or hydrogel compositions. For example, additives, such as sodium dodecyl sulfate (SDS), can increase the OTTT temperature of EPE while sodium sulfate ($Na_2SO_4$), can depress the OTTT temperature of TX-100.

Another embodiment of the present subject matter provides a method of temperature responsive particle size control. Preferably, these molecules, owing to the dehydration of PPO in EPE and 4-octylphenol in TX-100 at a certain temperature, may self-assemble into micelles in aqueous environments. The hydrophobic PPO blocks of EPE and 4-octylphenol of TX-100 form the micelle core, surrounded by an outer water-swelled coronal shell composed of hydrophilic PEO chains. Alternatively, with increasing temperature, the micelles can entangle with the hydrophilic coronal PEO chains to form a gel state. If the molecular weight of the PEO chains of EPE is far below the critical molecular entanglement weight of 1600, the micelle core cannot completely entangle but will only closely pack together with the PEO chains to form another gel state. Preferably, in the gel state, the dissolved organic substance (EPE and/or TX-100) is no longer completely soluble, precipitating a second phase and thereby manifesting a cloudy appearance.

A still further embodiment of the present subject matter provides a method of adjusting reversible OTTT by adding additives in different concentrations. For the opaque-transparent liquid or hydrogel compositions containing TX-100, the electrolyte, sodium sulfate ($Na_2SO_4$), may be used as an additive because it can affect the agglomeration of TX-100 micelles effectively. But for the liquid or hydrogel compositions containing EPE, an anionic surfactant additive, such as sodium dodecyl sulfate (SDS), may be added to regulate the phase separation of the EPE copolymer. The two additives were chosen as OTTT modifiers because they can affect the agglomeration of TX-100 or EPE micelles, respectively. The electrolyte additive, $Na_2SO_4$, can lower the OTTT of the nonionic surfactant, TX-100, while the anionic surfactant additive, SDS, can increase the OTTT of the nonionic surfactant, EPE.

A further embodiment of the present subject matter provides a method of labeling the particle size growth under different temperatures. Preferably, a trace amount of Rhodamine B (red fluorescence) or fluorescein isothiocyanate (FITC, green fluorescence) may be dispersed into the compositions of the present subject matter to provide the composition with a fluorescence, which can then be imaged. The amphiphilic nature of Rhodamine B and FITC is the source of their affinity to the surfactant molecules. After heating the compositions to a temperature above the OTTT, micron-sized fluorescent clusters can be observed, possibly due to the self assembly into micelles. As the temperature continues to increase, an intensification of the fluorescence induced by the further agglomeration of micelles can be detected. For the oil-in-water formulations, Rhodamine B was more dissolved in the oil (surfactants) phase leading to its concentration in oil phase larger than in water phase. Thus the fluorescent intensity of the agglomerated micelles is larger than that of the initial compositions. The detected dots of the fluorescence in the liquid or hydrogel compositions indicated the agglomeration of surfactant molecules.

In yet a further embodiment of the present subject matter a method of sunlight screen application is provided. The sunscreen efficiency of the compositions is determined by measuring the light transmittance as a function of temperature at either 350 nm, 700 nm, and 1100 nm regimes of visible light for the hydrogel or 400 nm, 600 nm, and 800 nm regimes of visible light for the liquid. With increasing addictive concentrations, the OTTT will change. For the EPE, in the form of a hydrogel or liquid, increasing the SDS concentration can increase the OTTT, while increasing the concentration of $Na_2SO_4$ can decrease the OTTT of TX-100. For the EPE in the liquid embodiment, it is especially significant when the added SDS content is higher than 0.2 w/v %. OTTT modification is thus shown to be a potential means of actively controlling the passage of light through the solution. The shift of the OTTT to a higher temperature can mean that the composition stays transparent at room temperature.

A further embodiment of the present subject matter provides a method of designing a smart window/roof for sunlight screen application. At low temperatures, the smart window is transparent because the copolymers are individual molecules. When the composition is heated to a higher temperature, it becomes opaque because the surfactant molecules begin to form micelles and separate phases. The whole process is reversible when the temperature decreases. In this manner the smart window/roof based on the compositions of the present subject matter can act to block sunlight when the compositions contained with the void between the window panes reach a specific temperature. Preferably, the compositions are used as the medium to control the passage of light through the smart window/roof.

In constructing the smart window/roof system, the compositions of the present subject matter are sandwiched between two or more pieces of transparent plastic films or thin glass. In another embodiment, the composition of the present subject matter can be placed between two or more panes of indium tin oxide (ITO)-sputtered glass with a 1 mm to 2 mm gap or void and apply an electric field to impart joule heating. A thermal couple was used for temperature feedback. The temperature can be controlled by adjusting the intensity of the electric field. At room temperature, the window is transparent but when the glass is heated to the OTTT, the resultant turbidity makes the window opaque.

Preferably, other designs can also be used to substitute for the ITO glass. For example, conductive copper wire 1 mm in width can be embedded within the panes of the window where an electric field may be used to heat the copper wire and in turn heat the liquid or hydrogel composition contained within the gap or void between the panes of the window. Preferably, the opaque-transparent conversion process is reversible. By cutting off the electric field and returning the system to room temperature, the window will recover its transparent state within several minutes, depending on how fast the temperature can be lowered.

Liquid Embodiment

The liquid embodiments of the present subject matter can be formulated with either EPE or TX-100, or mixtures thereof. Further, the liquid embodiments can be formulated as oil-in-water emulsions. As an example, EPE is a type of easily available tri-block copolymer that is widely used as a nonionic surfactant, due to its amphiphilic behavior in aqueous solution. There are a variety of types of EPE that can be differentiated by their overall molecular weight and relative hydrophobic PPO and hydrophilic PEO block lengths. In one embodiment, the EPE surfactants of the present subject matter have a total molecular weight of about 1600 to about 2500, and a molecular weight of the PEO content of about 1500 to about 2000. In a preferred embodiment, the EPE surfactants of the present subject matter have a total molecular weight of about 2000, and a molecular weight of the PEO content of about 1600. These molecules, due to the dehydration of their PPO block at a certain temperature, can self assemble to form micelles in aqueous solution. The hydrophobic PPO blocks form the micelle core, which is surrounded by an outer water-swelled coronal shell composed of hydrophilic PEO chains. Further, with increasing temperature, the micelle can entangle with the hydrophilic coronal PEO chains to form a gel state. It has also been reported that if the molecular weight of the PEO chains is far below the critical molecular entangle weight of 1600, the micelle core cannot completely entangle but will only closely pack together with the PEO chains (FIG. 1c).

Once in the gel or agglomerated state, the dissolved solids are no longer completely soluble, thereby precipitating a second phase and manifesting a cloudy appearance. Thus the cloudy appearance is induced by increasing temperature, and the temperature at which the cloudiness appears is termed the OTTT. Such a phenomenon is reversible if the temperature variation is reversed. The OTTT is adjustable by adding an additive, such as an electrolyte, for example sodium chloride, or an alternative amphiphilic molecule, for example sodium dodecyl sulfate (SDS), may be used as a cooperative surfactant to regulate the phase separation of the EPE copolymer.

The additive, SDS, may be chosen as an OTTT modifier because it can affect, in two ways, the agglomeration of EPE micelles. First, SDS's association with EPE micelles introduces repulsive charges that counteract the normal attractive forces. Second, SDS can form micelles between EPE micelles, thereby preventing micelles from growing into a large cluster. To establish the effect of SDS in modifying the OTTT, it is preferred that the EPE has an average molecular PEO weight lower than 1600, in order to lessen the entanglement of PEO chains and facilitate the interposition of SDS. See Example 6 below. OTTT modification was shown, thus, to be a potential means of actively controlling the passage of light through the solution. The shift of the OTTT to a higher temperature prevented the turbidity of the solution at room temperature. See Example 2 below.

Figure 2:
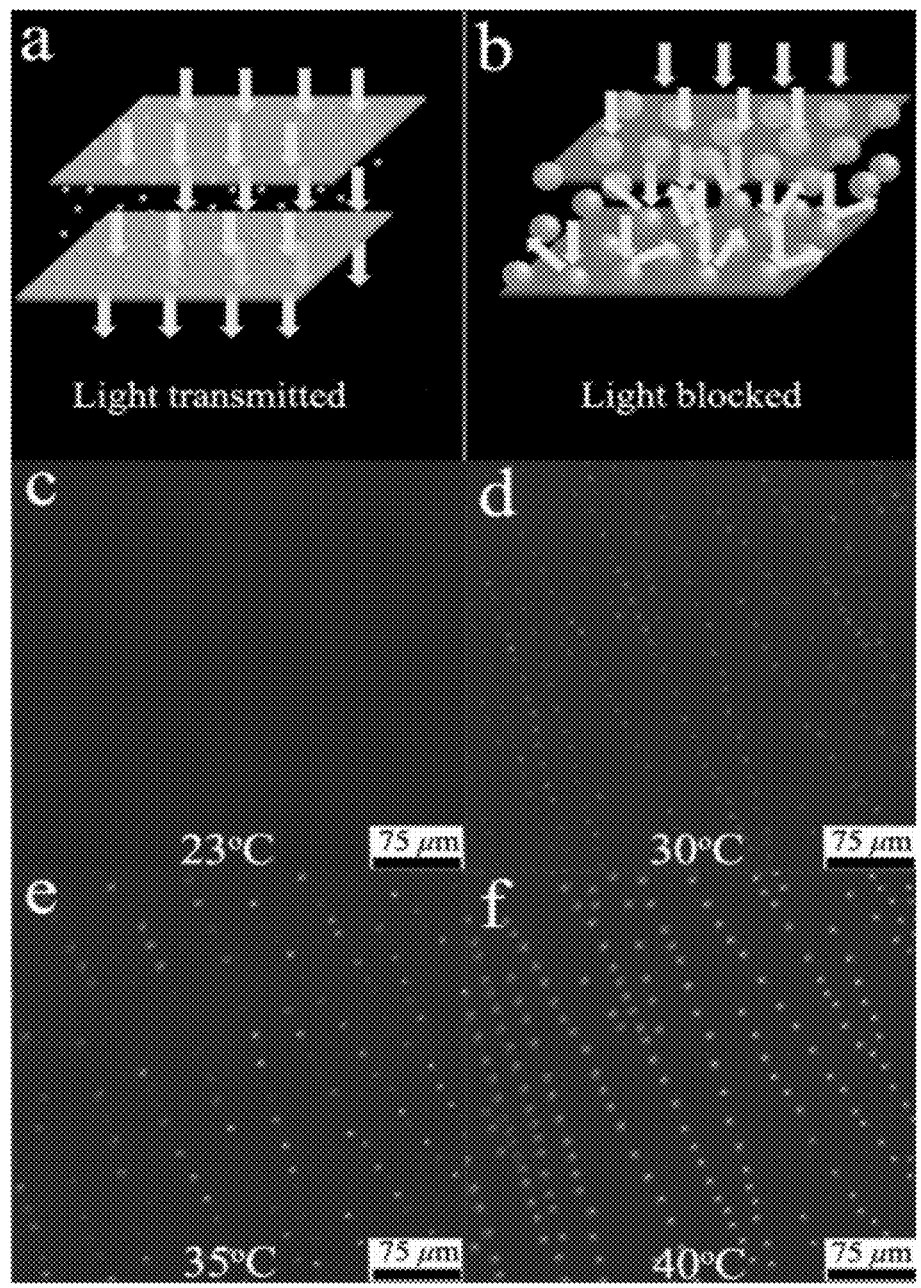
FIGS. 2 (a) and (b) are schematic pictures to illustrate the relationship between particle size and light transmission; (c)-(f) are Fluorescent spots detected under different temperatures.

The principle of producing a smart window or roof containing a liquid compositions comprising EPE is straightforward. At low temperatures, the copolymers are dissolved in a liquid carrier as individual molecules (FIG. 1a). When the solution is heated to the micellerization temperature, the EPE molecules begin to form micelles (FIG. 1b). If the temperature is increased further, the micelles aggregate into large clusters (FIG. 1c), the morphology of which is the cause of the turbid appearance. The whole process is accompanied by a transmittance change that enables complete opaqueness of the solution at the OTTT, thereby blocking radiation such as sunlight (FIGS. 2a, b). See Example 1 below.

Further, the gelation process of the EPE is reversible. To return the solution to a transparent state, the temperature of the solution is decreased below the OTTT. The speed at which the solution returns to the transparent state depends on how quickly the temperature of the solution can be decreased. See Example 3 below.

Hydrogel Embodiment

In addition to the liquid forms of the thermally induced self-assembly surfactant compositions above, the surfactants can be formulated as hydrogels with the inclusion of a hydrogel base. A cheap and accessible base material, including but not limited to a polysaccharide, a polypeptide, a derivative of acrylic acid or mixtures thereof, may be used as the hydrogel base. Agarose is particularly useful in this regard.

Figure 5:
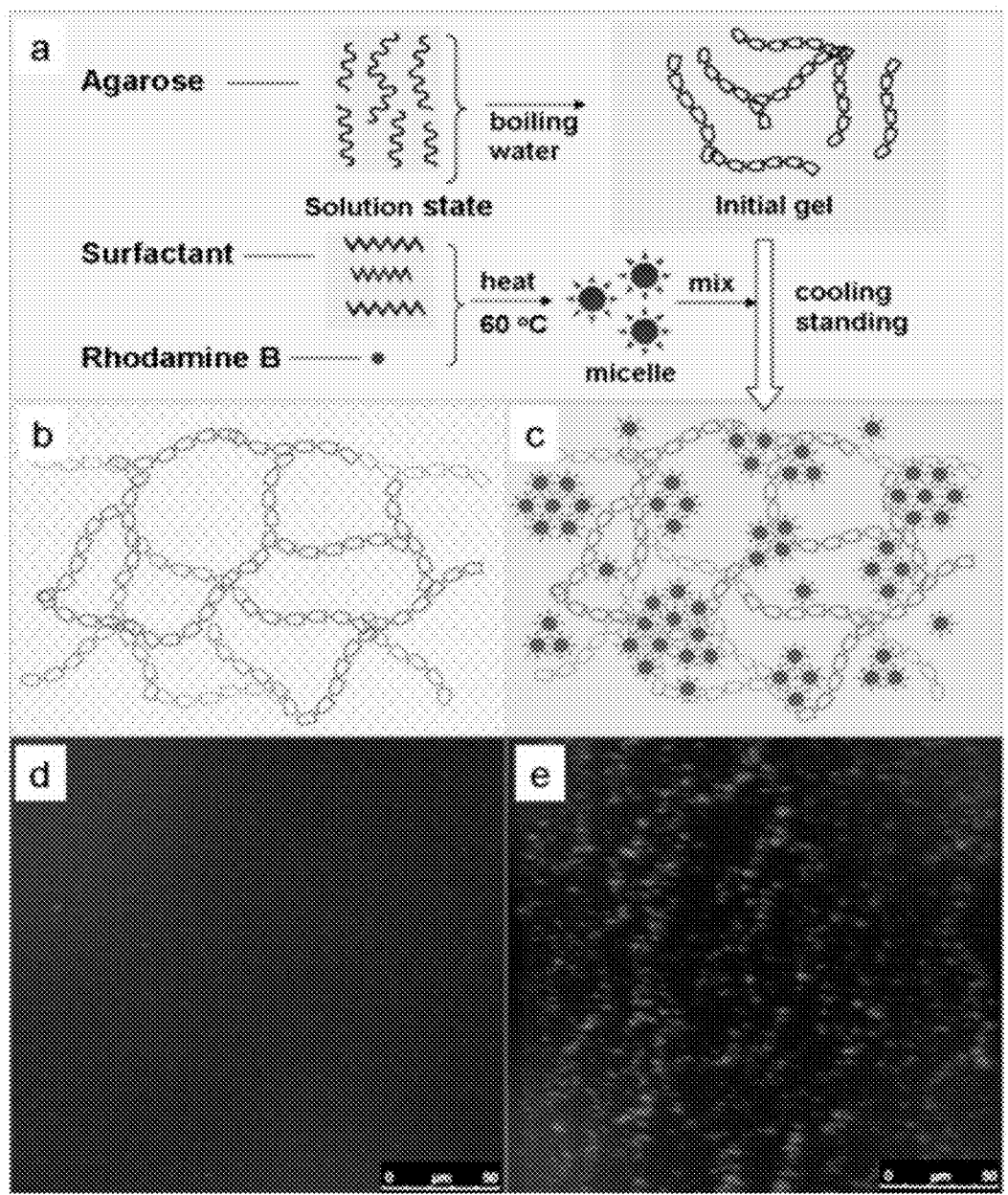
FIG. 5 is a possible mechanism of the formation of thermally-induced hydrogel. preparation process of initial hydrogel of agarose, surfactant and rhodamine B (a), hydrogel containing rhodamine B at 25° C.; (b), hydrogel containing rhodamine B at 55° C.; (c) Fluorescent spots detected at 25° C. (d) and 55° C. (e).

The molecular structure of the base material provides the capacity to form gels that are very strong even at low concentrations due to the presence of double helices formed from left-handed threefold helices. These double helices are stabilized by the presence of water molecules bound inside the double helical cavity. Exterior hydroxyl groups allow aggregation of up to 10,000 of these helices to form superfibers and a stable hydrogel (FIG. 5a, b).

As one non-limiting example, agarose is insoluble in cold water but dissolves to give random coils in boiling water. Gelation is reported to follow a phase separation process and association on cooling (~35° C.), forming gels with up to 99.5% water and remaining solid up to about 85° C. A preferred embodiment uses 0.5 w/v % of agarose solution as the hydrogel base. Agarose is the most popular medium for electrophoresis because of the large size for rapid diffusion and low background. Therefore, the surfactants, additives or fluorescent molecules can disperse uniformly in the gel network of agarose (FIGS. 5b, c).

Figure 6:
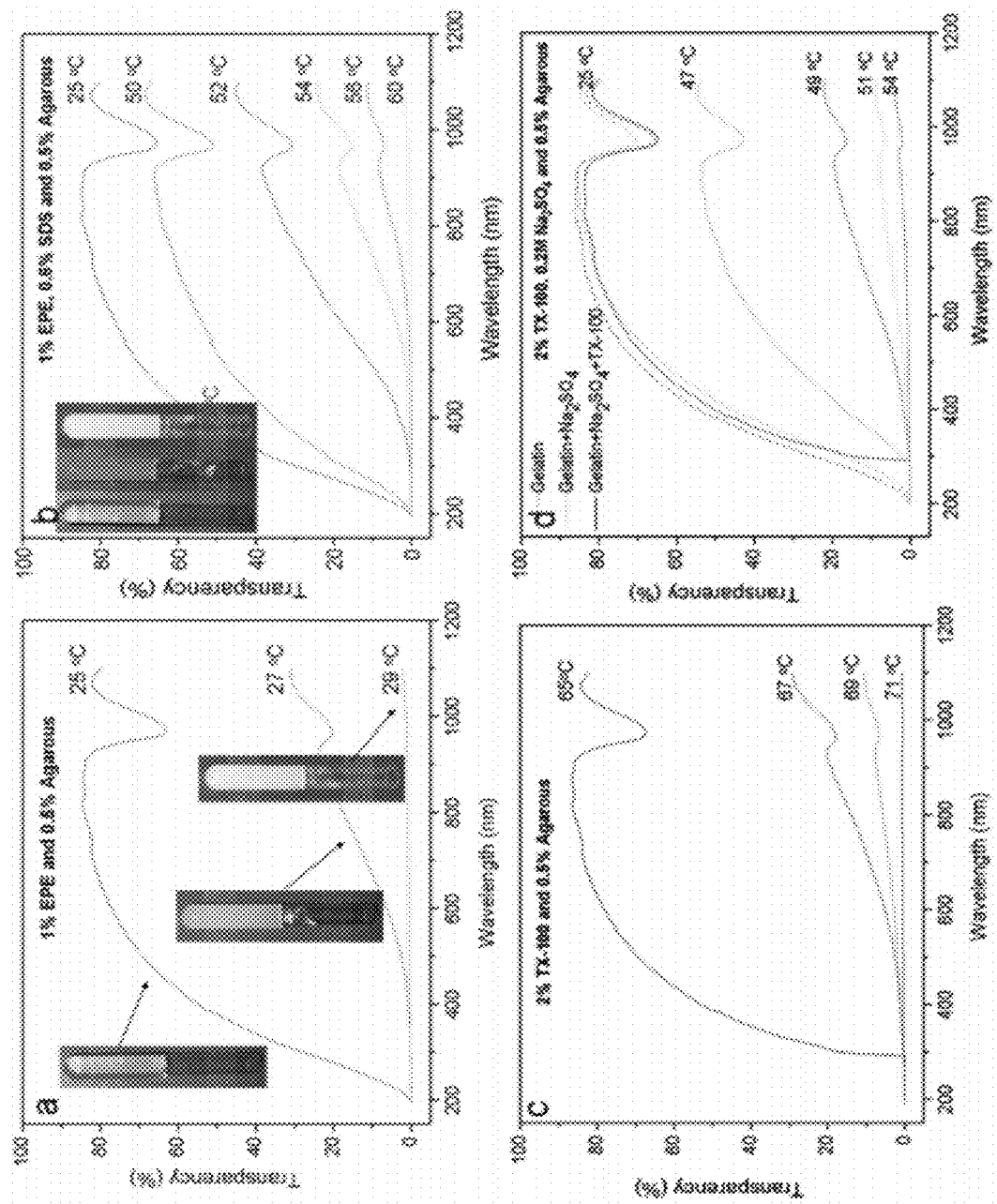
FIG. 6 is a graph showing the transparency measured at wavelength ranging from (a) 200 nm to 1100 nm of 1 w/v % EPE in 0.5 w/v % agarose hydrogel (b) 1 w/v % EPE, 0.6% w/v % in 0.5 w/v % agarose hydrogel, (c) 2% TX-100 in 0.5 w/v % agarose hydrogel, (d) 2% TX-100, 0.2M Na$_2$SO$_4$ in 0.5 w/v % agarose hydrogel. The insert photos are the hydrogels in glass tube at different temperatures.
Figure 10:
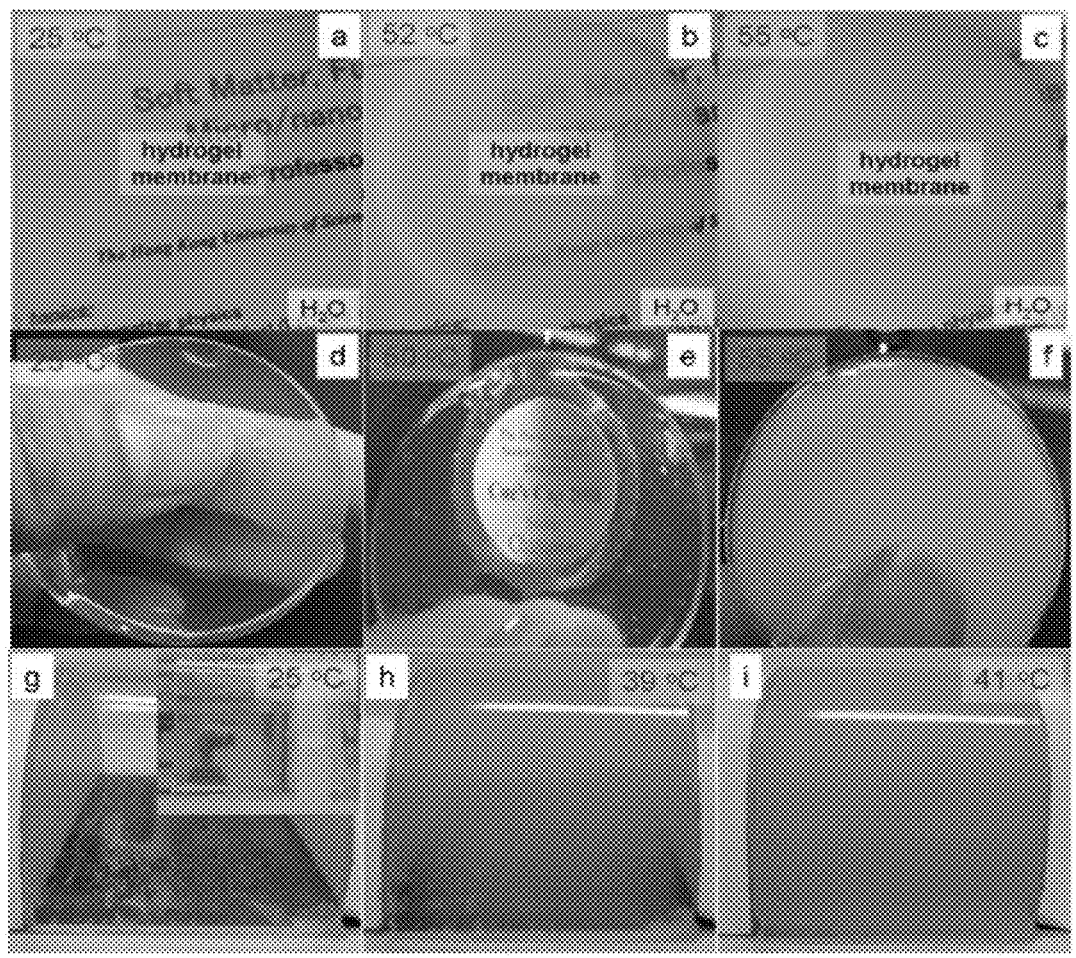
FIG. 10 shows the smart hydrogel membranes at different temperature, hydrogel membrane in water (a) at 25° C., (b) at 52° C., (c) at 55° C., (d) membrane 25° C., (e) 50° C., (f) 55° C., (g) model of greenhouse at 25° C. (insert image show a piece of hydrogel membrane, whose OTTT is 41° C., (h) at 39° C., (i) 41° C.

In the preparation of the hydrogel, the hot nonionic surfactant (micelles) solution is first mixed with the uniform agarose solution. After cooling the mixed solution without stirring, the hydrogel forms. At low temperatures, the nonionic surfactants, as individual molecules, are dissolved completely in the water of the hydrogel (FIG. 6b). When the hydrogel is heated to the OTTT the surfactant molecules begin to form micelles dispersed uniformly in the hydrogel matrix and cause phase separation due to the dehydration of hydrophobic groups. If the temperature is increased further, the neighboring micelles aggregate into larger clusters (FIG. 5c), the morphology of which is the cause of the turbid appearance. The whole process is accompanied by a transmittance change that enables complete opaqueness of the hydrogel at the OTTT, thereby blocking radiation such as sunlight (FIGS. 6a, 10c). This was verified with the inclusion of fluorescent markers in the hydrogel. See Example 7 below. These micron-sized micelle clusters have been observed in both EPE and TX-100 hydrogels.

Figure 8:
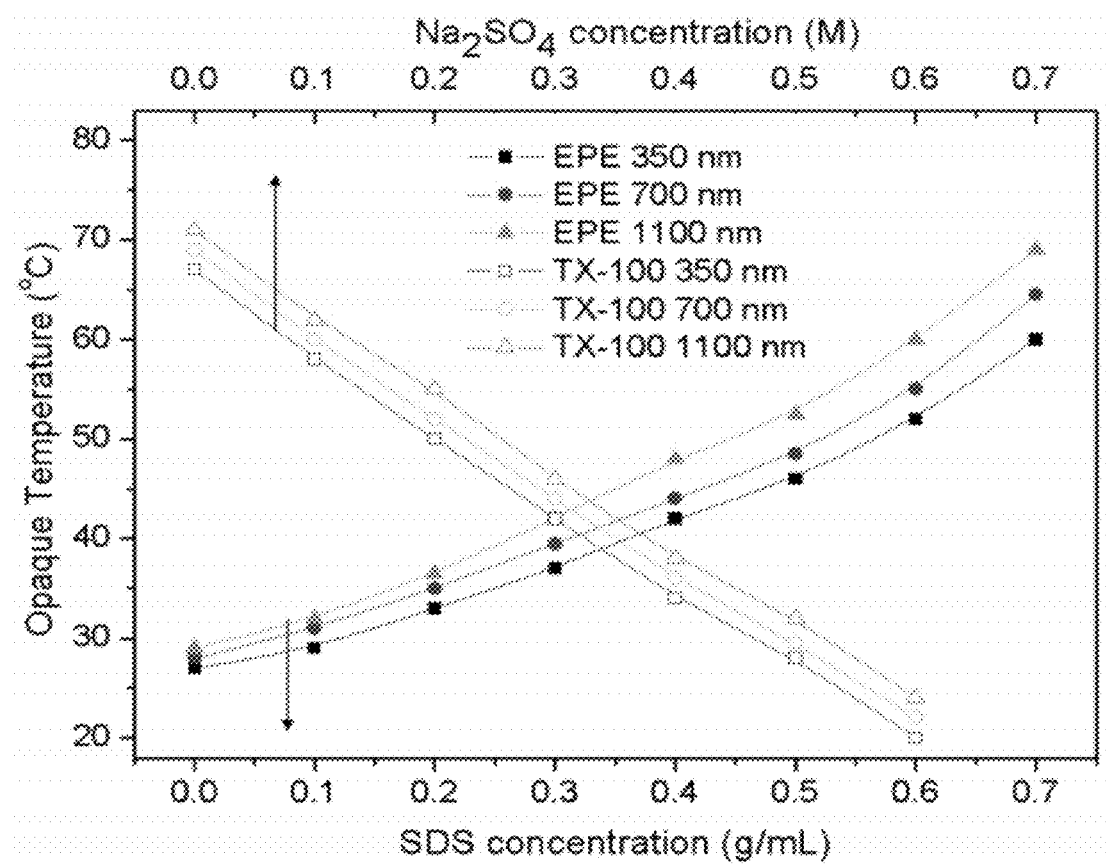
FIG. 8 is a graph showing the influence of additives (SDS, Na$_2$SO$_4$) concentration on the opaque temperature of hydrogel measured at 350 nm, 700 nm, and 1100 nm.

The additive, SDS and $Na_2SO_4$, were chosen as OTTT modifiers because they can affect the agglomeration of EPE and TX-100 micelles, respectively, in the hydrogel. The additives may influence the OTTT and the molecular self-assembly (gelation) in the hydrogel in response to light transmittance. Controlling the OTTT by adjusting the particle size as well as adjusting the particle size by changing the temperature is desirable. The range from the maximum transparency temperature to the minimum transparency temperature increases with wavelength (350 nm<700 nm<1100 nm). To show the effect of SDS and $Na_2SO_4$ in improving or depressing the OTTT, the opaque temperature as a function of $Na_2SO_4$/SDS concentration was drawn as shown in FIG. 8. With increases in the SDS concentration, the temperature at which the EPE hydrogel attained its opaque state shifted markedly to a higher region. In contrast, the temperature shifted to a lower region with increases in the $Na_2SO_4$ concentration in the TX-100 hydrogel. For both hydrogels, the OTTT is lower at a short wavelength. From FIG. 8, it can be seen that at higher temperatures the difference in the OTTT between the different wavelengths of the EPE hydrogel are larger than those of the TX-100 hydrogel. The OTTT modification was shown to be a potential means of actively controlling the passage of light through the hydrogel. Different hydrogels with different OTTTs are created through this method by varying the ratios of the surfactant to the additive.

The hydrogel becomes reversibly more and more opaque on heating. The rate of opaque-transparent transition depends on not only the properties of the specific surfactants used but also the thermal conductivity of the hydrogel. From FIG. 9a one can observe that the thermal transport distance increases with time, and the temperature decreases with increases in the distance from the source at a given moment. In FIG. 9b the temperature evolutions were shown for points with different distances from the thermal source. It can be seen that equilibrium is achieved in a short amount of time illustrating that the opaque-transparent transition of hydrogel reacts quickly.

The hydrogel may be used as a medium to control the passage of light through the smart windows or roofs. The passage of light through the hydrogels of the present subject matter was studied. See Example 7 below. Based on the properties of the hydrogels to control the passage of light, the hydrogel was used as a thermo-sensitive smart window and a medal was placed behind the glass. At lower temperatures, the window was transparent and the medal was clearly visible (FIG. 10e), while at higher temperature (>OTTT), the window was completely opaque, and no background was visible (FIG. 10f).

The windows or roofs of the present subject matter can further be used in the production of greenhouses. It is a common problem that the temperature rising in greenhouses due to excessive light exposure can lead to the death of the plants within the greenhouse. In a useful embodiment, the hydrogel can be used as a smart roof on the greenhouse (FIGS. 10h-10i). Because the smart windows of the present subject matter contain a liquid or hydrogel described herein, the roof will be opaque when the temperature of the composition in the roof of the greenhouse exceeds the OTTT. Thus, the tunable OTTT can serve as a switch or control of temperature in the greenhouse.

Uses for the Present Subject Matter

The compositions of the present subject matter can be used in a wide variety of applications. More specifically, the composition can be used to switch the transparency of windows, roofs, walls and doors. The windows, roofs, walls and doors containing the compositions of the present subject matter can be used in the construction of homes/buildings, greenhouses, aerocrafts, automobiles, medical devices, large-area displays for information and traffic engineering, and temperature-sensing applications in medical technologies, and any other application in which the smart glass technology would be beneficial. Further, the compositions of the present subject matter may be used as a temperature indicator, to provide privacy by clouding windows or walls, and to shield light from passing through the compositions. Still further, compositions of the present subject matter are advantageous due to the ease of preparing such compositions as well as the biocompatibility, degradability, stability and lower expense of the materials for producing the compositions.

EXAMPLES

Example 1

To verify the micelle cluster formation, a trace amount of fluorescein isothiocyanate (FITC, green fluorescence) was dissolved into 1 w/v % aqueous solution of EPE (total average molecular weight: 2000; molecular PEO weight: <1600, Sigma), and fluorescence imaged under an inverted fluorescence microscope (Axiovert 200M, Zeiss) equipped with a cooled CCD camera (Diagnostic Instruments). The amphiphilic nature of FITC is the source of its affinity for EPE molecules and also, thus, the rationale for its use in EPE-molecule labeling. Liquid was laid deposited on an ITO glass that is connected to electrodes for heating. Below the OTTT at 24° C., there were no fluorescent spots detected (FIG. 2c). But after heating the liquid to a temperature above the OTTT, micron-sized fluorescent clusters were observed, as the liquid transformed to the gel state. (FIG. 2d). After continued increase in temperature, an intensification of the fluorescence can be detected, induced by the further agglomeration of micelles (FIGS. 1e, f), leading eventually to the turbidity of the solution. These micron-sized micelle clusters have also been found in other EPE solutions of lower-than-1600 molecular PEO weight.

Example 2

Figure 3:
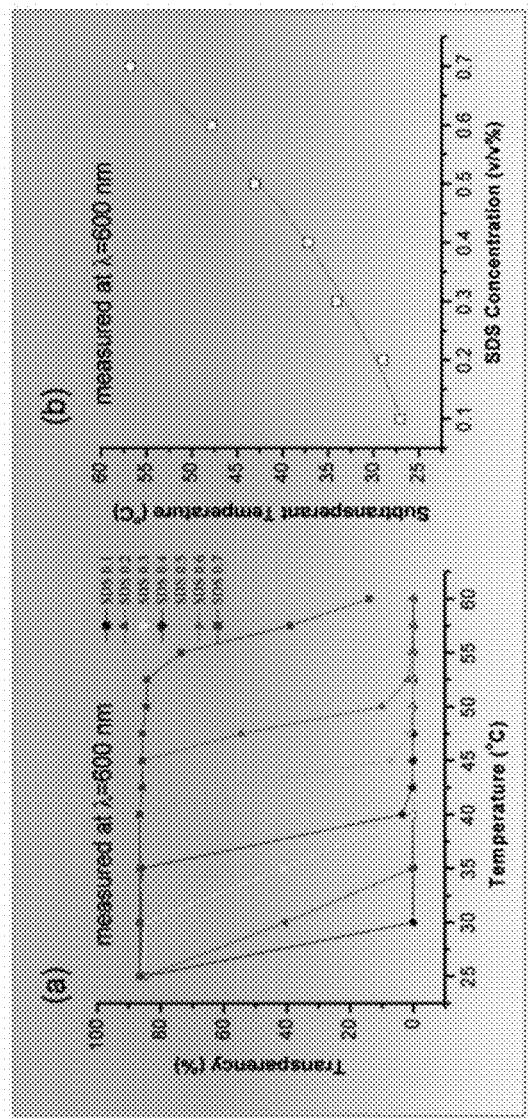
FIG. 3 is a graph showing the influence of SDS concentration on transmittance of EPE aqueous solution measured at (a) 600 nm, and (b) Influence of SDS concentration on subtransparent temperature.
Figure 4:
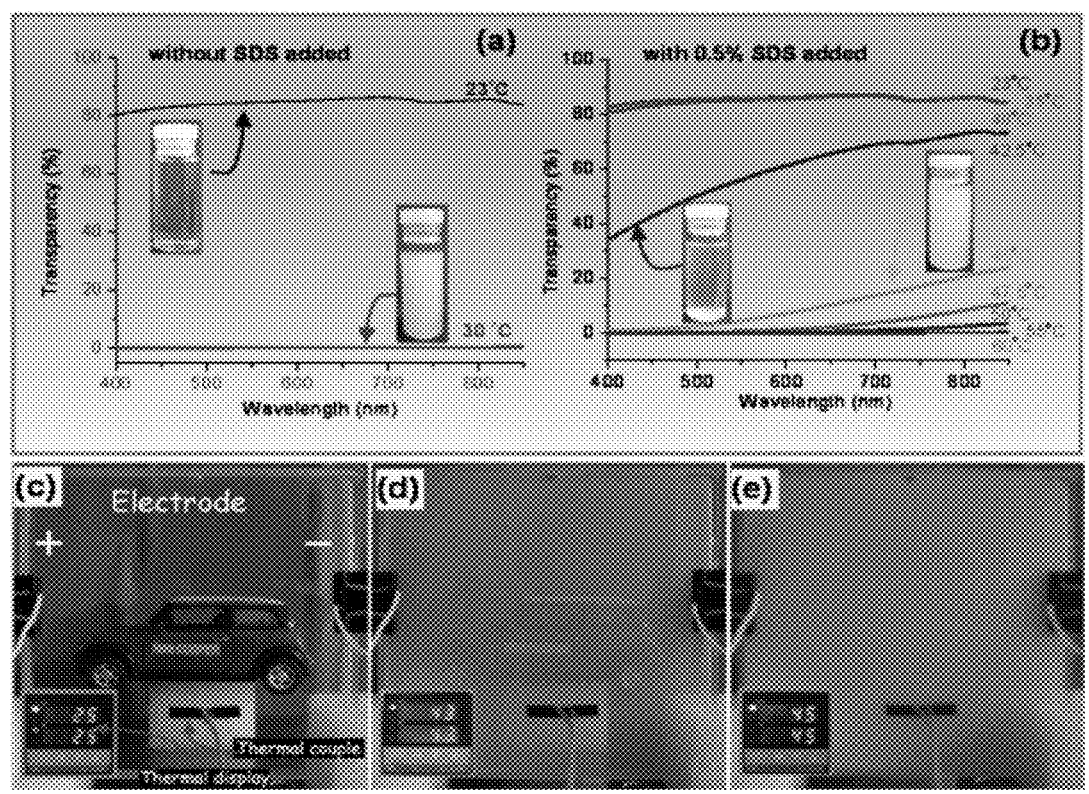
FIG. 4 is a graph showing transparency measured at wavelength ranging from 400 nm to 800 nm of (a) 1 w/v % aqueous solution of EPE without SDS added; (b) 1 w/v % aqueous solution of EPE with 0.5 w/v % SDS added; (c)-(e) show smart window fabricated by sandwiching EPE liquid between two pieces of ITO-coated glass panes operating at (c) room temperature, (d) 43° C. by applying a voltage, and (e) 45° C.

To confirm this, EPE solution was prepared without SDS. Under 23° C., the solution maintained perfect transparency (FIG. 4a). However, at 30° C., the solution was completely opaque, as shown in the insets of FIG. 4a. Then 0.5 w/v % of SDS was added, which advanced the EPE OTTT to 42.5° C. (FIGS. 3b). From 23° C. to 40° C., the transparency did not change a lot, the solution retaining an appearance likeable to pure water (FIG. 4b). At 42.5° C., some turbidity could be observed, and after the temperature was raised to 45° C., the solution became completely light-tight (FIG. 4b). The solution was used as medium to control the passage of light through the smart window. In constructing the smart window system, EPE was sandwiched between two panes of indium tin oxide (ITO)-sputtered glass with a 1 mm gap and applied an electric field to impart joule heating. A thermal couple was used for temperature feedback. The temperature could be controlled by adjusting the intensity of the electric field. A model car was placed behind the glass window to demonstrate the light screen. At room temperature, the window was transparent and the car, accordingly, was clearly visible (FIG. 4c). But when the glass was heated to the OTTT at 43° C., the resultant turbidity gave the window a cloudy appearance, and the profile of the model car became obscure (FIG. 4d). After further heating the glass to 45° C., the window screened most of the light, the window becoming completely opaque, no background being visible (FIG. 4e). This process is reversible. Cutting off the electric field and taking the system to room temperature, the glass window will recover its transparent state within several minutes, depending on how fast the temperature can be lowered.

Example 3

For the EPE hydrogel, 1 w/v % of EPE was used with different concentration SDS added in 0.5 w/v % agarose solution base as the medium to control passage of light through the hydrogel membrane (2 mm thickness). Properties of this hydrogel were first examined with different temperature. For the EPE hydrogel without SDS, under 25° C., the hydrogel maintained perfect transparency. However, at 30° C., the hydrogel was completely opaque, as shown in the insets of FIG. 3a. Then 0.6 w/v % of SDS was added, which increased the OTTT of EPE hydrogel to 55° C. From 25° C. to 48° C., the transparency did not change a lot, the hydrogel retaining an appearance likeable to pure hydrogel. At 52° C., some turbidity could be observed, and after the temperature was raised to 55° C., the hydrogel became completely light-tight (insert images in FIG. 5b). For the TX-100 hydrogel, 2 w/v % of TX-100 and $Na_2SO_4$ with different concentrations was used. OTTT of pure TX-100 hydrogel (~70° C.) is higher than that of pure EPE hydrogel (27° C.). Another difference between hydrogels with different surfactants is that below 300 nm the transmission through hydrogel with TX-100 is totally forbidden due to the absorption (FIG. 6d). The hydrogel is perfect transparency under 68° C. and opaque completely at 71° C. When 0.2 M $Na_2SO_4$ was added in TX-100 hydrogel, its OTTT decreased to ~54° C. At 47° C., some turbidity could be observed, and after the temperature was raised to 54° C. the hydrogel became completely opaque. The hydrogels were used as a medium to control the passage of light through the smart window.

Example 4

An amount of 0.1-0.7 w/v % of SDS was mixed into EPE hydrogel base, and 0.1-0.6 M $Na_2SO_4$ into TX-100 hydrogel base respectively. The sunscreen efficiency of the hydrogel was determined by measuring the light transmittance as a function of temperature at 350 nm, 700 nm and 1100 nm (FIG. 7). For both hydrogels, the transparency at 350 nm is less than 50%, which is much lower than those measured at 700 nm and 1100 nm.

Example 5

The thermal transport on the surface was studied by using the thermo camera (FLIR thermovision A40). A piece of hydrogel (~20° C.) was attached to a thermal source with constant temperature (~75° C.) and large thermal capacity. The temperature of the hydrogel surface was measured by the thermo camera. The experimental results were summarized in FIG. 9.

Example 6

A composition was prepared by mixing 0.1-0.7 w/v % of SDS with 1 w/v % of EPE solution. The sunscreen efficiency of the liquid was determined by measuring the light transmittance as a function of temperature at ranges of visible light (FIG. 3a). To show the effect of SDS in improving OTTT, the subtransparent transparency as a function of SDS concentration was drawn as shown in FIG. 3b. With increasing the SDS concentration, the temperature at which the liquid attained its subtransparent state shifted markedly to a higher temperature.

Example 7

In order to investigate the opaque effect, a piece of hydrogel membrane (2 mm thickness) was put into the water. The temperature may be controlled by changing water in the container. And a paper with color words was put under the transparent container to demonstrate the light screen. At room temperature, the hydrogel membrane was transparent and the color words, accordingly, was clearly visible (FIG. 10a). But when the water at room temperature was changed into hot water (near OTTT) 52° C., the resultant turbidity gave the membrane a cloudy appearance, and the profile of the color words became obscure (FIG. 10b). When temperature of the water is excess the OTTT (55° C.), the hydrogel membrane screened most of the light, the membrane becoming completely opaque, no background being visible (FIG. 10c). This process is reversible. When the temperature of water cools to room temperature, the hydrogel membrane will recover its transparent state within several minutes, depending on how fast the temperature can be lowered.

Example 8

The following is a non-limiting example of a hydrogel composition containing EPE as the surfactant.

| | |
|---|---|
| Agarose | 0.1-2.0 w/v % |
| EPE | 0.1-2.0 w/v % |
| SDS | 0-1.0 w/v % |
| Water | q.s. to 100% |

Example 9

The following is a non-limiting example of a hydrogel composition containing TX-100 as the surfactant.

| | |
|---|---|
| Agarose | 0.1-2.0 w/v % |
| TX-100 | 0.1-5.0 w/v % |
| $Na_2SO_4$ | 0-1.0M |
| Water | q.s. to 100% |

Example 10

The following hydrogel composition has an OTTT of about 28° C.

| | |
|---|---|
| Agarose | 0.5 w/v % |
| EPE | 1.0 w/v % |
| Water | q.s. to 100% |

Example 11

The following hydrogel composition has an OTTT of about 33° C.

| | |
|---|---|
| Agarose | 0.5 w/v % |
| EPE | 1.0 w/v % |
| SDS | 0.6 w/v % |
| Water | q.s. to 100% |

Example 12

The following hydrogel composition has an OTTT of about 70° C.

| | |
|---|---|
| Agarose | 0.5 w/v % |
| TX-100 | 2.0 w/v % |
| Water | q.s. to 100% |

Example 13

The following hydrogel composition has an OTTT of about 50° C.

| | |
|---|---|
| Agarose | 0.5 w/v % |
| TX-100 | 2.0 w/v % |
| $Na_2SO_4$ | 0.2M |
| Water | q.s. to 100% |

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A method of preparing an apparatus for controlling transparency of a window, wall or roof comprising:

preparing a hydrogel membrane composition having a variable opacity and an opaque-transparent transition temperature (OTTT), the hydrogel membrane composition consisting of:
  a. a thermally induced self-assembly surfactant consisting of poly(ethylene oxide)-poly(propylene oxide)-poly(ethylene oxide) (EPE), wherein the EPE is in an amount of 0.1-2.0 w/v % of the hydrogel membrane composition;
  b. sodium dodecyl sulfate as a modifier, wherein the sodium dodecyl sulfate is in an amount of 0.1-0.7 w/v % of the hydrogel membrane composition;
  c. a liquid carrier; and
  d. a hydrogel base material consisting of agarose, wherein the agarose is in an amount of 0.1-2.0 w/v % of the hydrogel membrane composition;

positioning at least two transparent panes and forming a void between the panes; and positioning the hydrogel membrane composition within the void between the panes thereby forming the apparatus for controlling transparency of a window, wall or roof, wherein the OTTT of the hydrogel membrane composition is adjustable by maintaining the ratio of modifier to EPE at 1-7 to 10 within the hydrogel membrane composition and the hydrogel membrane composition becomes opaque at or above the OTTT.

* * * * *